J. KRALOVICH.
DIRECTION INDICATOR.
APPLICATION FILED NOV. 12, 1917.
1,276,230.
Patented Aug. 20, 1918.
2 SHEETS—SHEET 1.
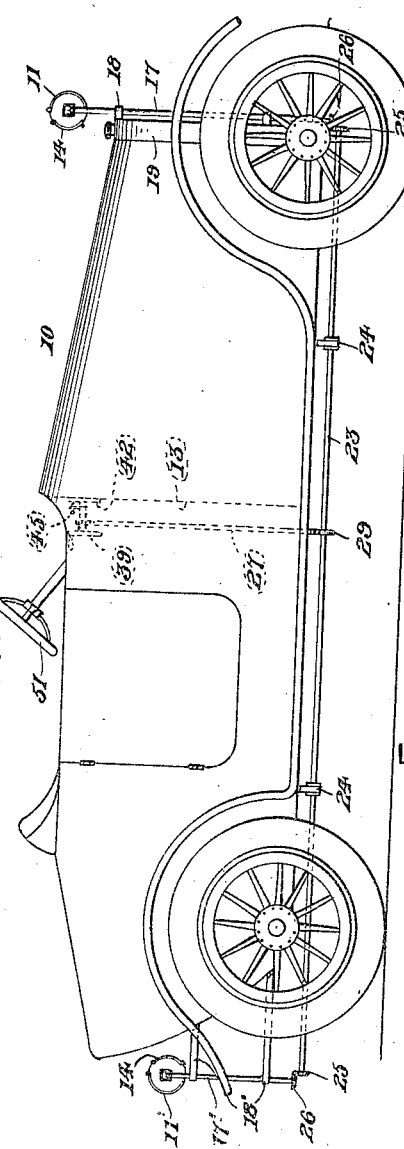
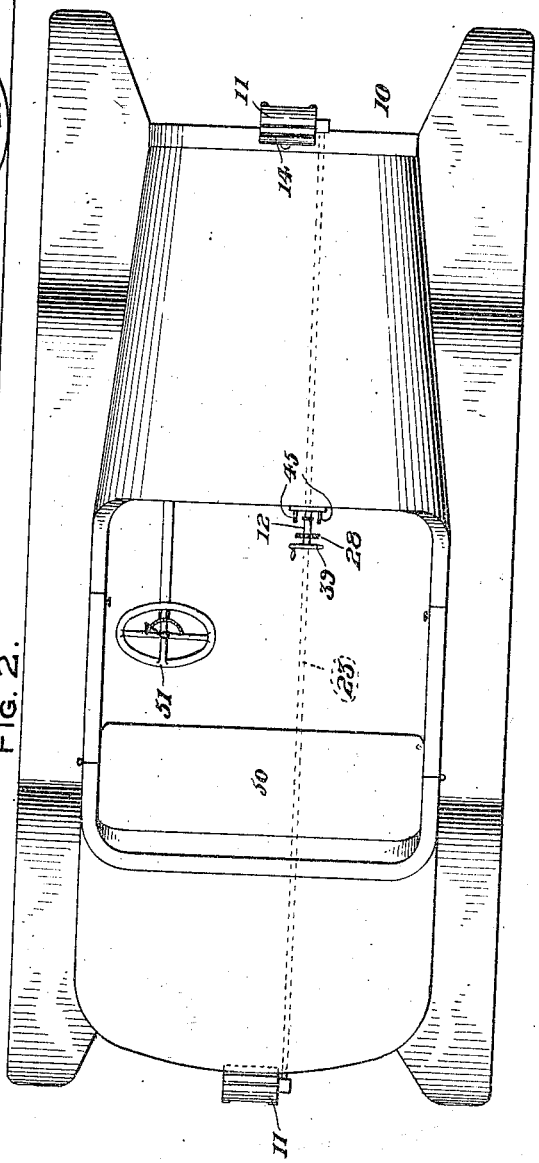
Inventor
J. Kralovich
By A. W. Wilson
Attorney J. KRALOVICH.
DIRECTION INDICATOR.
APPLICATION FILED NOV. 12, 1917.
1,276,230.
Patented Aug. 20, 1918.
2 SHEETS—SHEET 2.
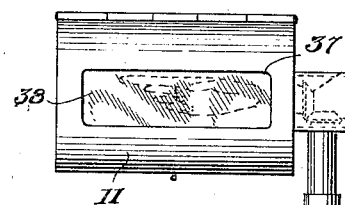
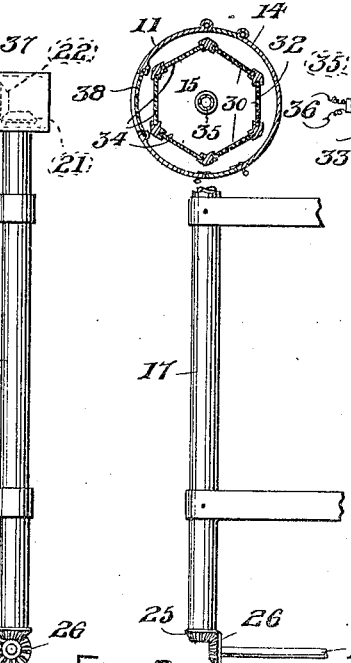
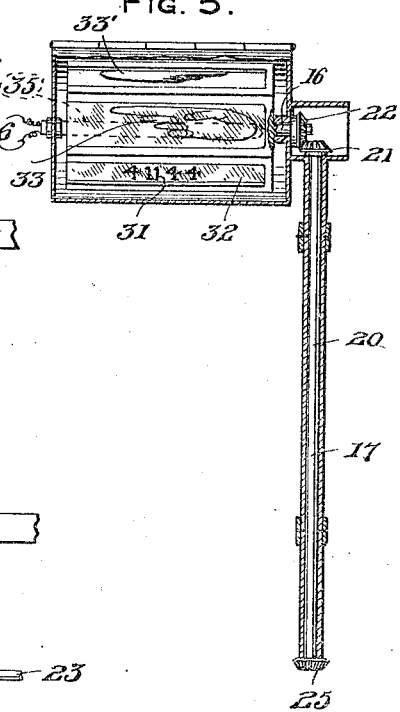
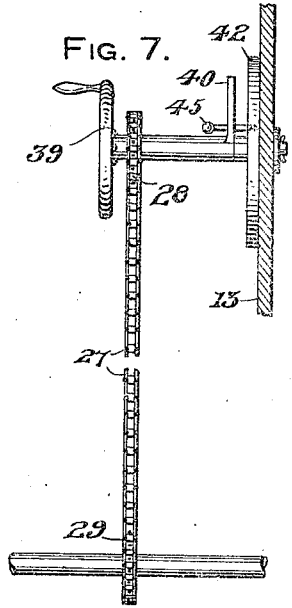
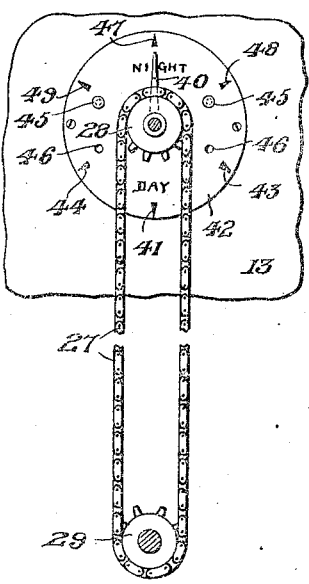
Inventor
J. Kralovich
By
Attorney

UNITED STATES PATENT OFFICE.

JOHN KRALOVICH, OF BINGHAMTON, NEW YORK.

DIRECTION-INDICATOR.

1,276,230.　　　　　Specification of Letters Patent.　　Patented Aug. 20, 1918.

Application filed November 12, 1917. Serial No. 201,512.

*To all whom it may concern:*

Be it known that I, JOHN KRALOVICH, a citizen of the United States of America, residing at Binghamton, in the county of Broome and State of New York, have invented certain new and useful Improvements in Direction-Indicators, of which the following is a specification.

This invention relates to certain new and useful improvements in direction indicators.

The primary object of the invention is the provision of a drum indicator for vehicles adaptable for use both in the day time and at night, whereby the intended future course of travel of the vehicle is readily indicated at points both forwardly and rearwardly thereof.

A further object of the device is the provision of means arranged at opposite ends of a vehicle and shiftable from a point adjacent the dashboard thereof whereby a plurality of indicators may be employed during the day time and different indicators during the night tine, all of which are operable by the same mechanism.

With these general objects in view and others that will become apparent as the nature of the invention is better understood, the same consists in the novel construction, combination and arrangement of parts hereinafter fully described, illustrated in the accompanying drawings and pointed out in the appended claims.

In the drawings forming a part of this application and in which like designating characters refer to corresponding parts throughout the several views, Figure 1 is a side elevation of an automobile provided with the present device.

Fig. 2 is a top plan view thereof.

Fig. 3 is an elevational view of the device at one end of the machine.

Fig. 4 is a transverse sectional view thereof.

Fig. 5 is a longitudinal sectional view of the same.

Fig. 6 is an elevational view of a portion of one of the indicating devices partially broken away.

Fig. 7 is a side elevation of the operating mechanism, and

Fig. 8 is a vertical sectional view thereof.

Referring more in detail to the drawings, my invention is herein illustrated in connection with an automobile 10, an indicator casing 11 of my form of construction being secured at the opposite ends thereof adapted for operation by a stub shaft 12 mounted upon the dash-board 13 of the automobile. The casings 11 are cylindrical in form with side doors 14 for gaining access to the interior thereof while a hexagonal drum 15 is axially journaled therein upon an axle 16. The forwardly positioned casing 11 is secured to the upper end of a tube 17 attached by brackets 18 to the front of the radiator 19 while a rod 20 journaled through the tube 17 has a beveled gear 21 at its upper end in constant mesh with a similar gear 22 upon the adjacent end of the axle 16.

The indicator means at the rear of the automobile is of identical construction including an upright tube 17' secured to the rear of the automobile by brackets 18'. An operating shaft 23 is journaled in brackets 24 beneath the automobile having gears 25 at its opposite ends in mesh with gears 26 upon the lower ends of the rods 20. The shaft 12 is operatively connected to the shaft 23 by means of a sprocket chain 27 running over the sprocket wheels 28 and 29 carried by the said shafts 12 and 23 respectively.

Three sides 30 of the drum 15 are formed of solid strips of material such as sheet metal with the automobile number such as shown at 31 arranged upon the outer face 32 of the central one of said three panels while indicating hands 33 are arranged upon the outer faces of the adjacent panels 30 pointing in opposite directions. The three opposite sides or panels 34 are formed of transparent material such as glass and have opaque hands and numbers arranged thereon similar to the indications upon the panels 30. An electric lamp 35 is arranged within the drum 15 having suitably controlled circuit wires 36 whereby the indication upon the panels 34 will be readily visible in the night time when the lamp 35 is lighted. An opening 37 is arranged in the front wall of each casing 11 preferably provided with a glass plate 38 and whereby the indicating hands 33 and numbers 31 may be readily visible from points forwardly and rearwardly of the automobile.

It will be understood that upon turning the shaft 13 by means of the hand wheel 39, any desired one of the panels 30 may be positioned in alinement with the casing opening 37 whereby the indication is visible exteriorly of the casing. The panels 30 are for employment during the day time and a finger 40 is carried by the shaft 12 adapted to normally point downwardly toward an indicating pin 41 upon a dial plate 42 of the dash-board 13, when the drum 15 is in its normal position during the day time with the number 31 upon the panel 32 positioned for viewing through the glass plate 38. The connections are such that upon turning the wheel 39 to shift the finger 40 toward the right adjacent the point 43 that the hand 33 which points toward the right will then be visible through the glass 38 while upon turning the wheel 39 to shift the finger 40 adjacent the point 44, the hand 33 which points toward the left will be visible.

Pegs 45 are adapted to be positioned in sockets 46 of the dial 42 during the day time, thereby limiting the turning of the wheel 39 and finger 40 within the arc of travel at which the points 43 and 44 are arranged substantially at the opposite ends thereof. The panels 34 are employed during the night time, suitably illuminated by the lamp 35, the middle panel thereof with its number 31 being normally arranged inwardly of the casing 37 and at which times the finger 40 points toward the upper points 47. When the intended path of travel of the automobile is toward the right, the wheel 39 is turned toward the right, moving the finger 40 clockwise and bringing the hand 33' which points toward the right upon one of the panels 34 in alinement with the opening 37 and at which times the finger 40 will point toward the point 48. In a similar manner, the shifting of the wheel 39 toward the left or counter-clockwise will bring the finger 40 pointing toward the point 49 of the dial 42 and positioning the hand 33 which points toward the left in alinement with the casing opening 37.

In this manner, it will be seen that the driver of the automobile 10 positioned upon the seat 50 adjacent the steering wheel 51 thereof may readily shift the indicating means for denoting the future path of travel of the vehicle in either direction by means of the conveniently positioned hand wheel 39, while the automobile number 31 will be normally arranged viewable through the casing opening 37. The pins 45 are in the positions herein indicated in Fig. 8 of the drawing during the night time and it may be seen at a glance at what position the indicators are arranged, while it will be apparent that the same are equally serviceable during the day or night. The casings 11 may be arranged wherever desired upon the vehicle and more than two of the same may be provided.

What I claim as new is:—

In combination with a vehicle, a direction indicating drum journaled thereon having day and night direction indications, a position indicating dial fixed upon the vehicle with night and day position indicating points, a stub shaft operatively connected to the said drum concentrically journaled in the said dial, an indicating finger upon the said stub shaft having a path of movement adjacent the dial and adjustable stop pins for the finger arranged in one position during the day time and in another position when the device is adapted for indicating directions of travel during the night time.

In testimony whereof I affix my signature.

JOHN KRALOVICH.